US012587905B2

(12) United States Patent
Nayak et al.

(10) Patent No.: US 12,587,905 B2
(45) Date of Patent: Mar. 24, 2026

(54) METHOD AND APPARATUS FOR MOBILE AP BACKHAUL LINK SETUP AND OPERATION

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 17/809,262

(22) Filed: Jun. 27, 2022

(65) Prior Publication Data

US 2023/0007540 A1 Jan. 5, 2023

Related U.S. Application Data

(60) Provisional application No. 63/341,833, filed on May 13, 2022, provisional application No. 63/218,188, filed on Jul. 2, 2021.

(51) Int. Cl.
| | |
|---|---|
| *H04W 28/24* | (2009.01) |
| *H04W 76/15* | (2018.01) |
| *H04W 88/08* | (2009.01) |

(52) U.S. Cl.
CPC ........... *H04W 28/24* (2013.01); *H04W 76/15* (2018.02); *H04W 88/08* (2013.01)

(58) Field of Classification Search
CPC ..... H04W 28/24; H04W 76/15; H04W 88/08; H04W 28/0866; H04W 40/22; H04W 76/22; H04W 84/12
See application file for complete search history.

(56) References Cited

U.S. PATENT DOCUMENTS

| | | | |
|---|---|---|---|
| 2012/0176958 A1* | 7/2012 | Queseth ............. | H04B 7/15542 370/315 |
| 2013/0094505 A1* | 4/2013 | Sarikaya ............... | H04L 45/741 370/390 |

(Continued)

OTHER PUBLICATIONS

IEEE P802.11be/D1.0; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT); May 2021; 635 pgs.

(Continued)

*Primary Examiner* — Rina C Pancholi

(57) ABSTRACT

Methods and apparatuses for facilitating the use of stations (STAs) of a multi-link device (MLD) to set up and operate backhaul links to serve a Mobile access point (AP) within the same MLD in a wireless local area network. The apparatuses include an MLD comprising APs forming a Mobile AP MLD, backhaul STAs, and a processor operably coupled to the APs and the backhaul STAs. The processor is configured to instruct at least one of the APs to set up an access link with a corresponding STA of a non-AP MLD, and to instruct at least one of the backhaul STAs to set up a backhaul link with a corresponding AP of an AP MLD to carry traffic of the non-AP MLD that flows through the Mobile AP MLD over the access link.

20 Claims, 18 Drawing Sheets

(56) References Cited

U.S. PATENT DOCUMENTS

| | | | | | |
|---|---|---|---|---|---|
| 2013/0294329 | A1* | 11/2013 | Huang | .................. | H04B 7/15 |
| | | | | | 370/315 |
| 2015/0063246 | A1* | 3/2015 | Zhang | .................. | H04W 76/11 |
| | | | | | 370/329 |
| 2019/0335454 | A1* | 10/2019 | Huang | .................. | H04W 8/26 |
| 2020/0212970 | A1* | 7/2020 | Wang | .................. | H04W 56/0045 |
| 2021/0185607 | A1* | 6/2021 | Cariou | .................. | H04W 52/0216 |
| 2021/0385888 | A1* | 12/2021 | Akl | .................. | H04W 28/18 |
| 2022/0124857 | A1* | 4/2022 | Patil | .................. | H04W 76/14 |
| 2022/0141911 | A1* | 5/2022 | Cook | .................. | H04W 24/08 |
| | | | | | 370/329 |
| 2022/0255849 | A1* | 8/2022 | Huang | .................. | H04W 84/12 |
| 2022/0337338 | A1* | 10/2022 | Homchaudhuri | .................. | |
| | | | | | H04W 52/0254 |
| 2023/0023779 | A1* | 1/2023 | Shafin | .................. | H04W 16/14 |
| 2023/0388920 | A1* | 11/2023 | Solaija | .................. | H04L 5/0091 |

OTHER PUBLICATIONS

IEEE P802.11be-D1.5; Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT); Mar. 2022, 831 pgs.

International Search Report and Written Opinion issued Sep. 30, 2022 regarding International Application No. PCT/KR2022/009492, 8 pages.

Schelstraete et al., "Multi-AP backhaul analysis", doc.: IEEE 802.11-19/1588, Sep. 2019, 18 pages.

Kneckt et al., "AP MLD Beaconing and Discovery", doc.: IEEE 802.11-20/865r2, Jul. 2020, 28 pages.

Porat et al., "Performance of JT with Wireless Backhaul", doc.: IEEE 802.11-19/1909r0, Nov. 2019, 14 pages.

Yangbo et al., "Access mechanisms to meet the requirements of low latency traffics", doc.: IEEE 802.11-20-1355/r5, Oct. 2020, 28 pages.

Extended European Search Report issued Jun. 5, 2024 regarding Application No. 22833694.7, 9 pages.

Au, "Specification framework for TGbe", IEEE 802.11-19/1262r23, Jan. 2021, 116 pages.

"35. Extremely high throughput (EHT) MAC specification"; IEEE P802.11 be/D0.3, Jan. 2021, pp. 125-152.

IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

LAN/MAN Standards Committee of the IEEE Computer Society; IEEE P802.11be/D1.01; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); Jun. 2021; 657 pgs.

* cited by examiner

| B0 B7 | B8 B11 | B12 B19 | B20 | B21 | B22 B23 |
|---|---|---|---|---|---|
| MLD ID | Link ID | BSS Parameters Change Count | All Updates Included | Backhaul STA Indicator | Reserved |
| 8 | 4 | 8 | 1 | 1 | 2 |

Bits:

| B0 B3 | B4 | B5 | B6 | B7 | B8 | B9 | B10 | B11 | B12 B15 |
|---|---|---|---|---|---|---|---|---|---|
| Link ID | Complete Profile | STA MAC Address Present | Beacon Interval Present | DTIM Info Present | NSTR Link Pair Present | NSTR Bitmap Size | BSS Parameters Change Count Present | Backhaul STA Indicator | Reserved |
| 4 | 1 | 1 | 1 | 1 | 1 | 1 | 1 | 1 | 4 |

Bits:

| | | | | | |
|---|---|---|---|---|---|
| B0   B1 | B2<br>B5 | B6<br>B8 | B9<br>B24 | B25<br>B28 | B29   B31 |
| Direction | TID | User<br>Priority | Presence<br>Bitmap of<br>Additional<br>Parameters | Link ID | Reserved |

Bits:       2             4             3                 16              4                   3

FIG. 12

1306 — AP receives negotiation frame from STA?

No → No action needed yes

1308 — AP determines the appropriate reconfiguration either by using the STA's recommendation or on its own 1310 — AP sends necessary confirmation to the STA about link reconfiguration 1314 — AP adopts the new configuration at the indicated time

| Element ID | Length | Element ID extension | Per link configuration 1 | Per link configuration 2 | .... |
|---|---|---|---|---|---|
| 1 | 1 | 1 | 3 | 3 | |

Octet:

| Link ID | Desired channel number | Channel config change time |
|---|---|---|
| 1 | 1 | 1 |

Octet:

| Element ID | Length | Element ID extension | Reconfiguration link count | Reconfiguration change time | Link ID List |
|---|---|---|---|---|---|
| 1 | 1 | 1 | 1 | 1 | variable |

Octet:

| Link ID 1 | Link ID 2 | ... |
|---|---|---|
| 4 | 4 | |

Bits:

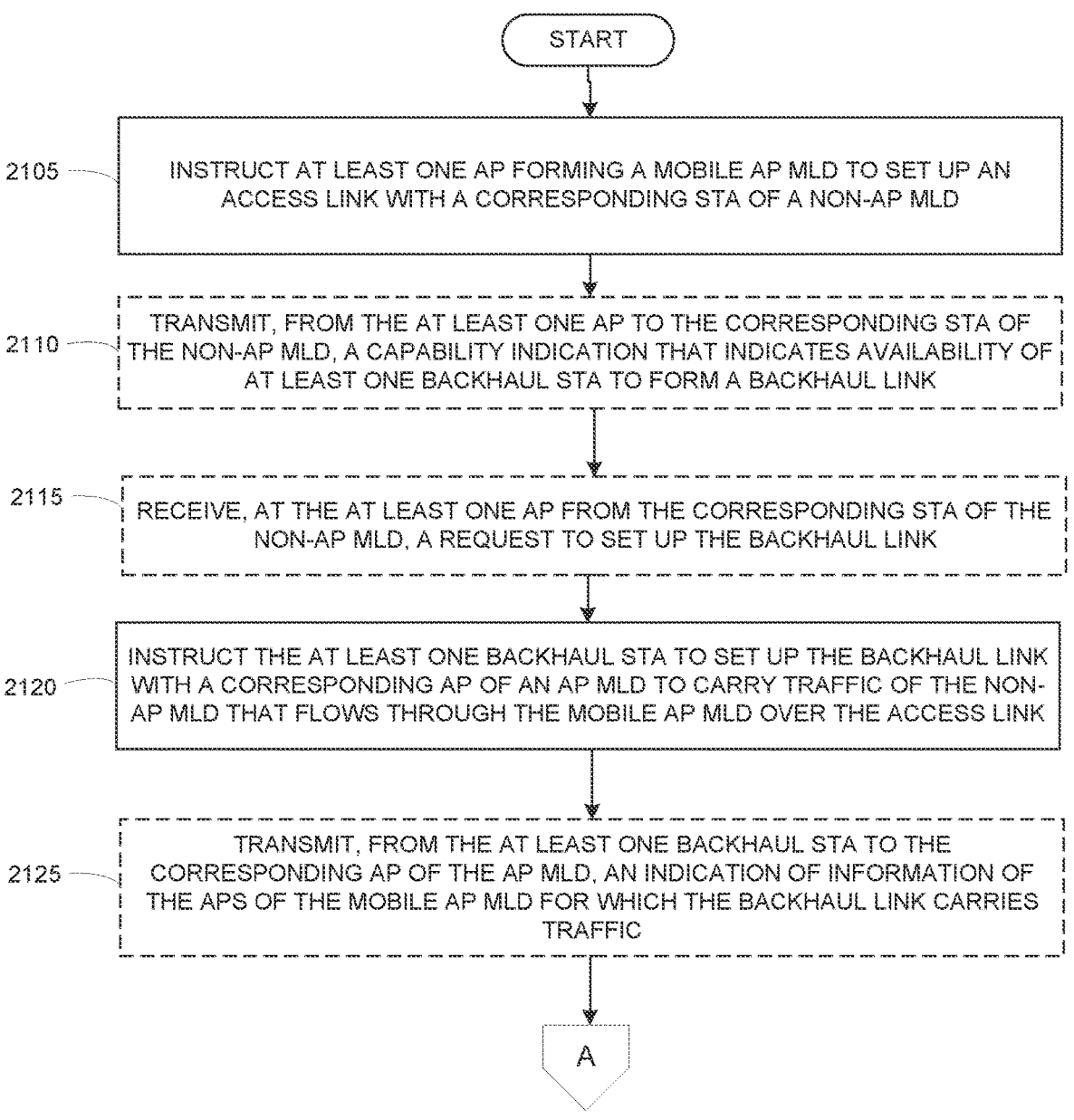

START

2105 — INSTRUCT AT LEAST ONE AP FORMING A MOBILE AP MLD TO SET UP AN ACCESS LINK WITH A CORRESPONDING STA OF A NON-AP MLD

2110 — TRANSMIT, FROM THE AT LEAST ONE AP TO THE CORRESPONDING STA OF THE NON-AP MLD, A CAPABILITY INDICATION THAT INDICATES AVAILABILITY OF AT LEAST ONE BACKHAUL STA TO FORM A BACKHAUL LINK

2115 — RECEIVE, AT THE AT LEAST ONE AP FROM THE CORRESPONDING STA OF THE NON-AP MLD, A REQUEST TO SET UP THE BACKHAUL LINK

2120 — INSTRUCT THE AT LEAST ONE BACKHAUL STA TO SET UP THE BACKHAUL LINK WITH A CORRESPONDING AP OF AN AP MLD TO CARRY TRAFFIC OF THE NON-AP MLD THAT FLOWS THROUGH THE MOBILE AP MLD OVER THE ACCESS LINK

2125 — TRANSMIT, FROM THE AT LEAST ONE BACKHAUL STA TO THE CORRESPONDING AP OF THE AP MLD, AN INDICATION OF INFORMATION OF THE APS OF THE MOBILE AP MLD FOR WHICH THE BACKHAUL LINK CARRIES TRAFFIC

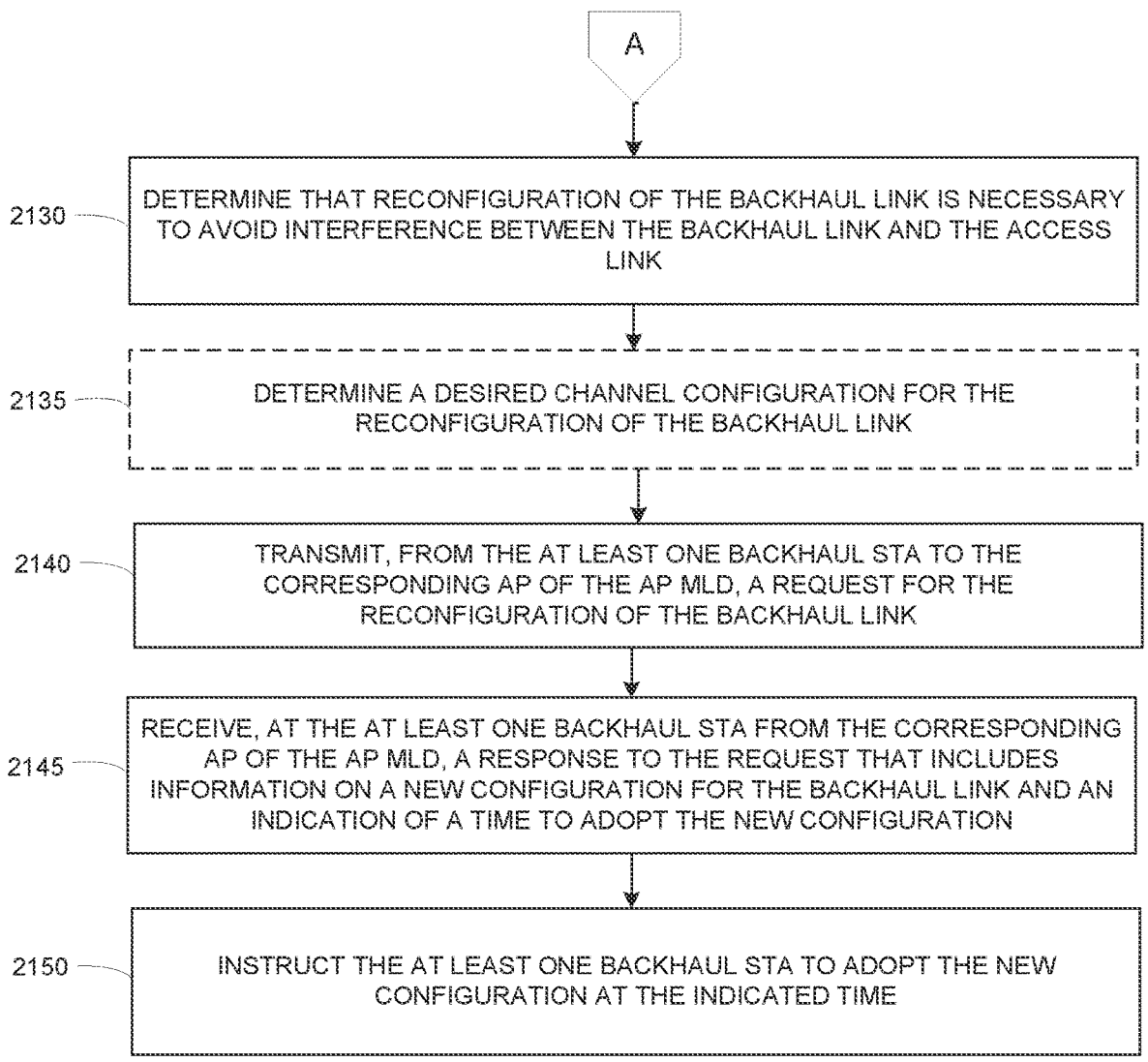

2130 — DETERMINE THAT RECONFIGURATION OF THE BACKHAUL LINK IS NECESSARY TO AVOID INTERFERENCE BETWEEN THE BACKHAUL LINK AND THE ACCESS LINK

2135 — DETERMINE A DESIRED CHANNEL CONFIGURATION FOR THE RECONFIGURATION OF THE BACKHAUL LINK

2140 — TRANSMIT, FROM THE AT LEAST ONE BACKHAUL STA TO THE CORRESPONDING AP OF THE AP MLD, A REQUEST FOR THE RECONFIGURATION OF THE BACKHAUL LINK

2145 — RECEIVE, AT THE AT LEAST ONE BACKHAUL STA FROM THE CORRESPONDING AP OF THE AP MLD, A RESPONSE TO THE REQUEST THAT INCLUDES INFORMATION ON A NEW CONFIGURATION FOR THE BACKHAUL LINK AND AN INDICATION OF A TIME TO ADOPT THE NEW CONFIGURATION

2150 — INSTRUCT THE AT LEAST ONE BACKHAUL STA TO ADOPT THE NEW CONFIGURATION AT THE INDICATED TIME

FIG. 21B

2155 —— RECEIVE QOS EXPECTATIONS OF A TRAFFIC FLOW CORRESPONDING TO THE TRAFFIC THAT FLOWS THROUGH THE MOBILE AP MLD

2160 —— TRANSMIT, FROM THE AT LEAST ONE BACKHAUL STA TO THE CORRESPONDING AP OF THE AP MLD, A QOS CHARACTERISTIC ELEMENT THAT INCLUDES THE QOS EXPECTATIONS OF THE TRAFFIC FLOW AND AN INDICATION THAT THE TRAFFIC FLOW CORRESPONDS TO THE MOBILE AP MLD

METHOD AND APPARATUS FOR MOBILE AP BACKHAUL LINK SETUP AND OPERATION

CROSS-REFERENCE TO RELATED APPLICATION(S) AND CLAIM OF PRIORITY

This application claims priority under 35 U.S.C. § 119(e) to U.S. Provisional Patent Application No. 63/218,188 filed on Jul. 2, 2021, and U.S. Provisional Patent Application No. 63/341,833 filed May 13, 2022, which are hereby incorporated by reference in their entirety.

TECHNICAL FIELD

This disclosure relates generally to the setup and operation of backhaul links for a Mobile Access Point in wireless communications systems that include multi-link devices. Embodiments of this disclosure relate to methods and apparatuses for facilitating the use of stations of a multi-link device to set up and operate backhaul links to serve a Mobile Access Point within the same multi-link device in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

MLO has two variations. The first type is simultaneous transmit/receive (STR) where the STAs affiliated with an MLD can transmit and receive independent of each other. The second variation is non-simultaneous transmit/receive (NSTR) in which the links formed by the STAs affiliated with an MLD do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MLDs are more likely not to be capable of STR, and thus use NSTR.

An MLD can be configured as a Mobile AP. For instance, when a battery powered mobile device is configured as a Mobile AP, it executes the functionalities of an AP. It can utilize links with a WI-FI router as the backhaul and one or more links connected to another MLD to provide connectivity to that other MLD. The role of an AP is performed on the latter links. When configured as a Mobile AP, an MLD may be required to support high throughput applications (e.g., AR, VR, etc.).

SUMMARY

Embodiments of the present disclosure provide methods and apparatuses for facilitating the use of STAs of an MLD to set up and operate backhaul links to serve a Mobile AP within the same MLD in a wireless local area network.

In one embodiment, an MLD is provided, comprising APs forming a Mobile AP MLD, backhaul STAs, and a processor operably coupled to the APs and the backhaul STAs. The APs and the backhaul STAs each comprise a transceiver. The processor is configured to instruct at least one of the APs to set up an access link with a corresponding STA of a non-AP MLD, and to instruct at least one of the backhaul STAs to set up a backhaul link with a corresponding AP of an AP MLD to carry traffic of the non-AP MLD that flows through the Mobile AP MLD over the access link.

In another embodiment, a method performed by an MLD is provided, including the steps of instructing at least one AP forming a Mobile AP MLD to set up an access link with a corresponding STA of a non-AP MLD, and instructing at least one backhaul STA to set up a backhaul link with a corresponding AP of an AP MLD to carry traffic of the non-AP MLD that flows through the Mobile AP MLD over the access link. The MLD comprises the at least one AP forming the Mobile AP MLD and the at least one backhaul STA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C. B and C. and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-2020, "Wireless LAN Medium Access Control (MAC) and Physical Layer (PHY) Specification".

[2] IEEE P802.11be/D1.0-35.3.14 (Multi-link channel access).

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example Control Info field format of a QoS characteristic element including an indication of that QoS expectations of a traffic flow correspond to traffic being generated by a Mobile AP MLD according to various embodiments of the present disclosure;

FIGS. 21A-21C illustrate an example process facilitating the use of STAs of an MLD to set up and operate backhaul links to serve a Mobile AP within the same MLD in WLANs according to various embodiments of the present disclosure.

DETAILED DESCRIPTION

FIGS. 1 through 21C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that devices, such as non-AP MLDs, associated with a Mobile AP MLD for traffic flows may need an internet connection to run various services such as gaming applications, video applications, etc. Consequently, an architecture and procedure for setting up backhaul links to provide internet access to the devices associated with the Mobile AP MLD is necessary.

Accordingly, embodiments of the present disclosure provide apparatuses and methods that facilitate setting up backhaul links for a Mobile AP MLD. Further, the disclosure also provides methods and signaling procedures for their discovery as well as exchanging relevant information.

Figure 1:
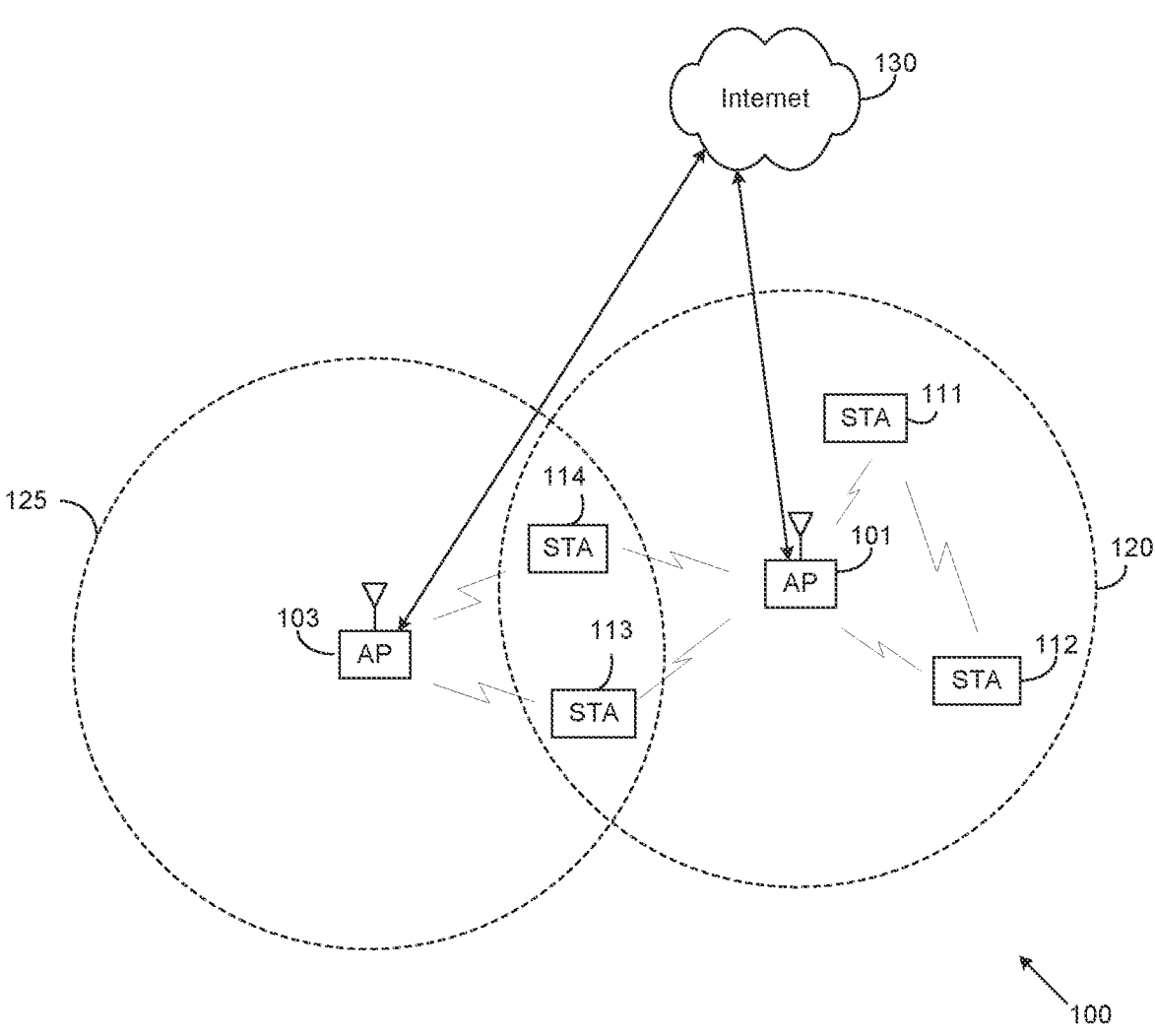
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with AP, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the use of STAs of an MLD to set up and operate backhaul links to serve a Mobile AP within the same MLD in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
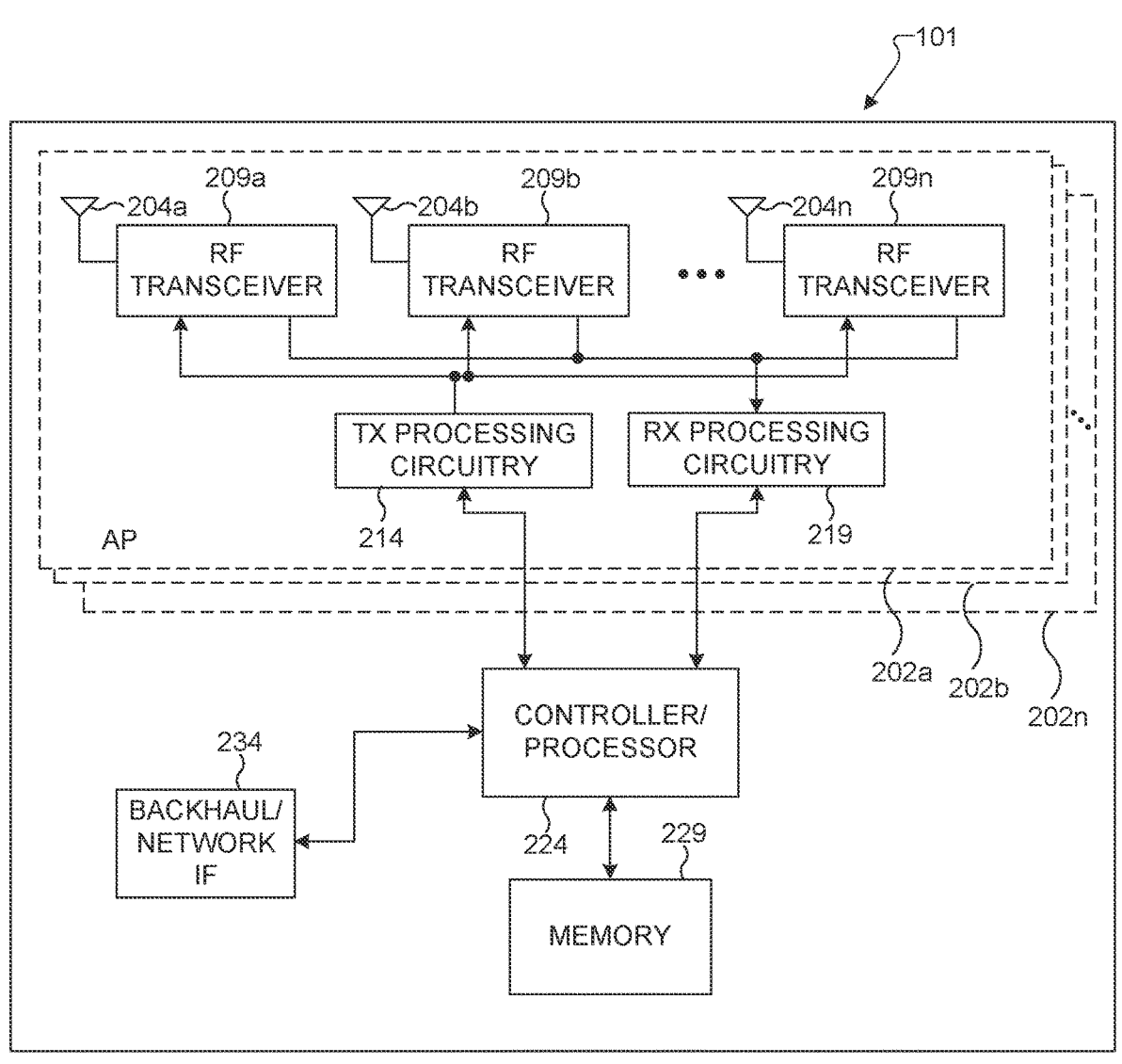
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. In other embodiments, each affiliated AP 202a-202n can operate at various different bandwidths, and the RF transceivers 209a-209n include transceivers capable of operating at those different bandwidths. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the use of STAs of an MLD to set up and operate backhaul links to serve a Mobile AP within the same MLD in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the use of STAs of an MLD to set up and operate backhaul links to serve a Mobile AP within the same MLD in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
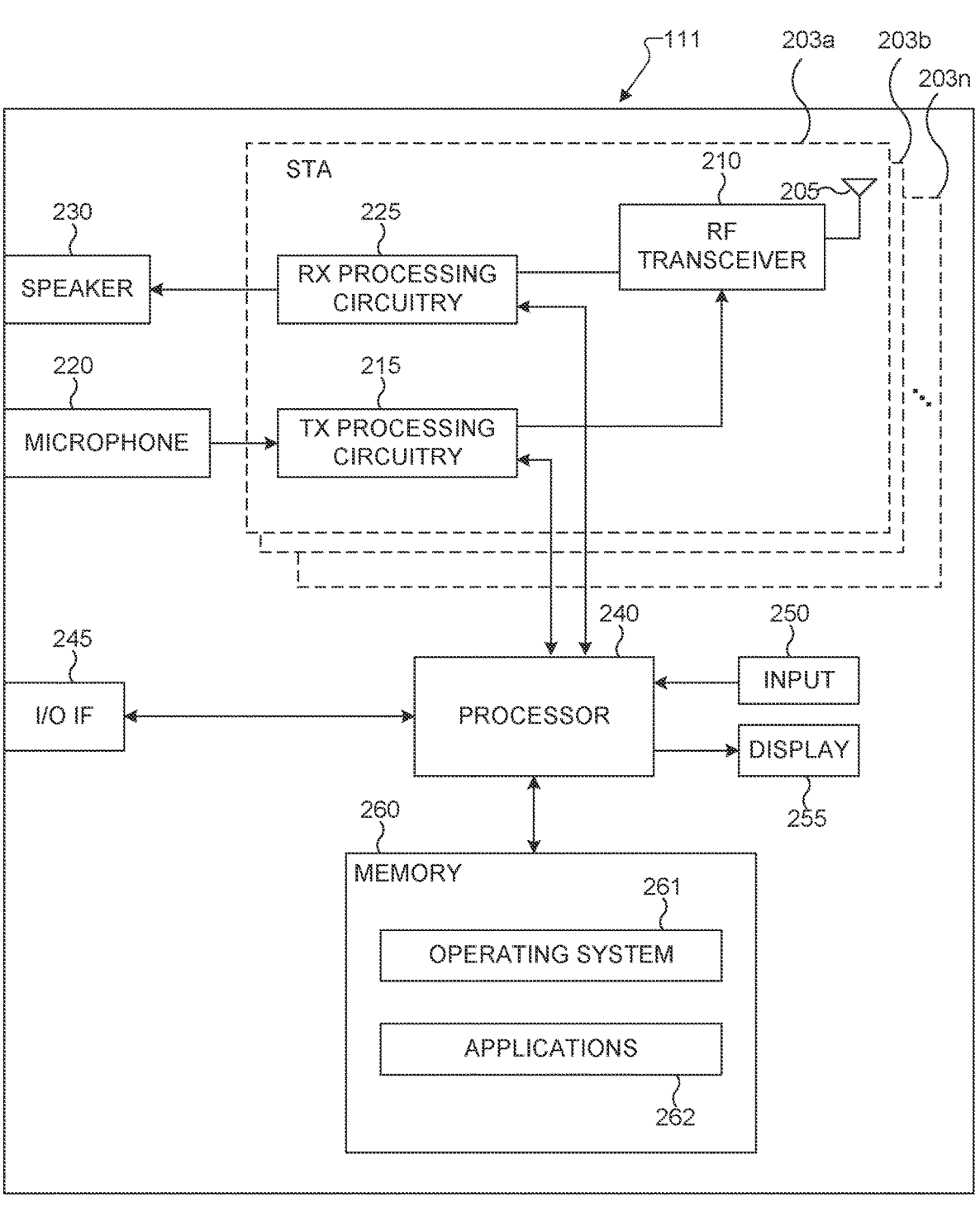
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. In other embodiments, each affiliated STA 203a-203n can operate at various different bandwidths, and may include multiple RF transceivers that are capable of operating at those different bandwidths. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the use of STAs of an MLD to set up and operate backhaul links to serve a Mobile AP within the same MLD in WLANs. In some embodiments, the controller/processor 240 includes at least one microprocessor or microcontroller.

The controller/processor 240 is also capable of executing other processes and programs resident in the memory 260, such as operations for facilitating the use of STAs of an MLD to set up and operate backhaul links to serve a Mobile AP within the same MLD in WLANs. The controller/processor 240 can move data into or out of the memory 260 as required by an executing process. In some embodiments, the controller/processor 240 is configured to execute a plurality of applications 262, such as applications for facilitating the use of STAs of an MLD to set up and operate backhaul links to serve a Mobile AP within the same MLD in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

In various embodiments of the present disclosure, the non-AP MLD 111 of FIG. 2B may be an MLD in which some of the STAs 203a-203n are configured as non-AP STAs and some are configured as AP STAs that form a Mobile AP MLD within the MLD 111. The AP STAs of the Mobile AP MLD are configured to associate with other non-AP MLDs, such as non-AP MLD 112. Meanwhile, the non-AP STAs of the MLD 111 may form backhaul links with an AP MLD, such as AP MLD 101. The backhaul links may be used as a backhaul for traffic flowing through the AP STAs of the Mobile AP MLD from the associated non-AP MLDs (such as non-AP MLD 112). The backhaul links may be set up on-demand as needed or requested.

Figure 3:
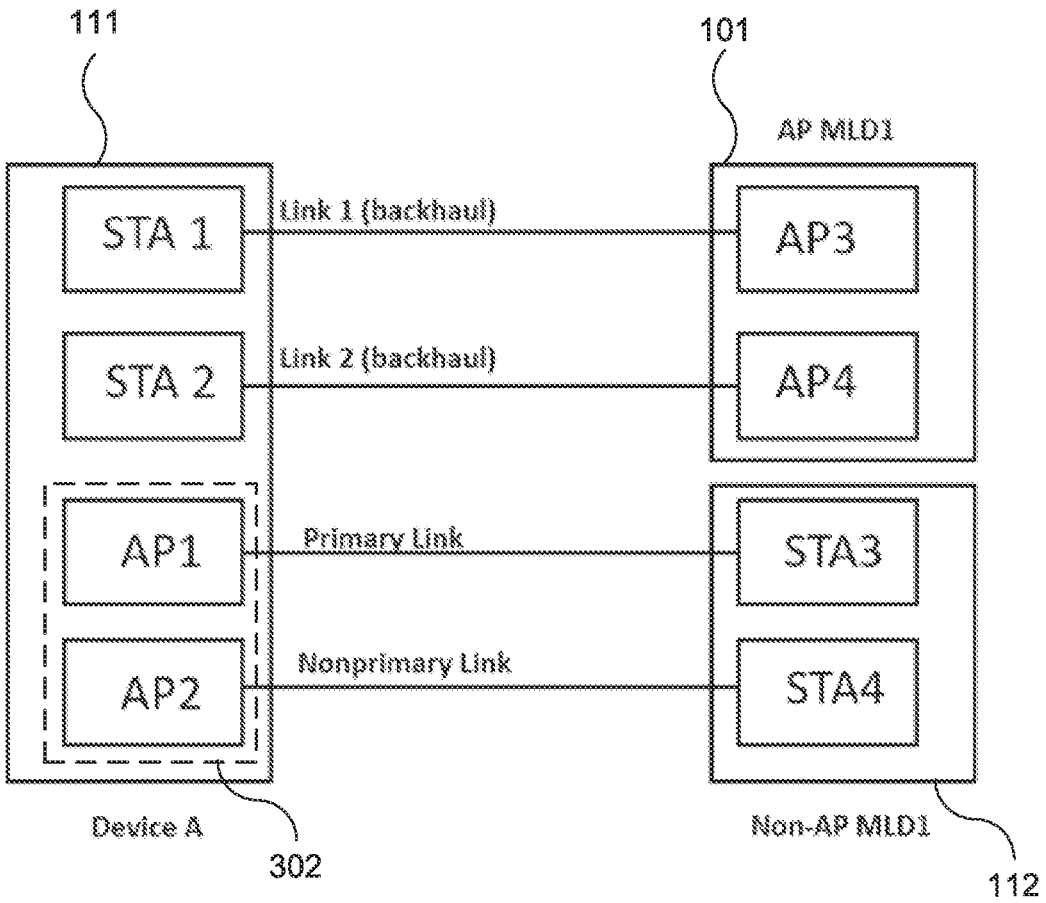
FIG. 3 illustrates an example network scenario including an MLD that comprises both non-AP STAs and AP STAs that form a Mobile AP MLD according to various embodiments of the present disclosure.

FIG. 3 illustrates an example network scenario including an MLD that comprises both non-AP STAs and AP STAs that form a Mobile AP MLD according to various embodiments of the present disclosure. For ease of explanation, the AP MLD 101 (also referred to as AP MLD1) is illustrated with two affiliated AP STAs, the MLD 111 (also referred to as Device A) is illustrated with two affiliated non-AP STAs, and two affiliated AP STAs, and the non-AP MLD 112 is illustrated with two affiliated non-AP STAs, but it is understood that this scenario could be applied with suitable MLDs having any number of affiliated AP STAs or non-AP STAs.

As shown in FIG. 3, STA1 and STA2 located on Device A are configured as non-AP STAs whereas AP1 and AP2 located on Device A are configured as AP STAs (or simply APs) that form a Mobile AP MLD 302 (which may be referred to simply as a Mobile AP). The non-AP STAs (STA 1 and STA 2) and the AP STAs (AP1 and AP2) are affiliated with the same MLD (Device A). Further, STA1 and STA2 form link1 and link2 after association with AP3 and AP4, respectively, which are affiliated with AP MLD1. Further, AP1 and AP2 of the Mobile AP MLD form primary link and non-primary link with STA3 and STA4, respectively, which are affiliated with non-AP MLD1.

According to one embodiment, the above architecture can be used to lower the latency for traffic flowing from AP MLD1 to non-AP MLD1 via the Mobile AP. According to another embodiment, the above architecture can be used to create on-demand backhaul links (in addition to existing backhaul links) to boost the net speed of the backhaul for the Mobile AP.

According to some embodiments, such an on-demand backhaul link can be requested by the non-AP STAs affiliated with the non-AP MLD1 to the AP STAs affiliated with the Mobile AP. That is, the non-AP STAs affiliated with the non-AP MLD1 can send a request to the AP STAs affiliated with the Mobile AP. Upon receiving such a request, the AP STAs affiliated with the Mobile AP MLD can then create an on-demand backhaul link to boost the net speed of the backhaul.

According to one embodiment, in order to create an awareness that device A has setup its Mobile AP MLD and backhaul according to the above architecture, device A can provide an indication via frames transmitted by the Mobile AP MLD or frames transmitted by the STAs that constitute the backhaul links. The Mobile AP MLD can indicate its capability to form backhaul links to the non-AP MLD1 associated with it in one or more frames transmitted by the Mobile AP MLD to the non-AP MLD1.

According to this embodiment, the Mobile AP MLD can provide information related to the STAs that are capable of setting up backhaul links to the associated non-AP MLD1 in one or more frames transmitted by the Mobile AP MLD to the non-AP MLD1. The Mobile AP MLD can indicate the availability of, and information related to, the STAs that are capable of setting up backhaul links via a Reduced Neighbor Report element. Further, according to this embodiment, an AP affiliated with the Mobile AP MLD can include a reduced neighbor report element containing such information in beacon and probe response frames that it transmits, and such beacon and probe response frames can be transmitted on the primary link of the Mobile AP MLD.

When the non-AP MLD associated with the Mobile AP MLD receives such information, it can interpret such information as information corresponding to STAs that constitute the backhaul after determining that the transmitter sending such information is a Mobile AP MLD. Further, according to this embodiment, the Mobile AP MLD can indicate that the information it transmits to its associated non-AP MLD in a reduced neighbor report element corresponds to a STA constituting the backhaul link by providing an indication in one of the fields of the reduced neighbor element. According to one such embodiment, this indication may be made using one or more bits from the MLD Parameters sub-field of the reduced neighbor report element.

Figures 4, 5:
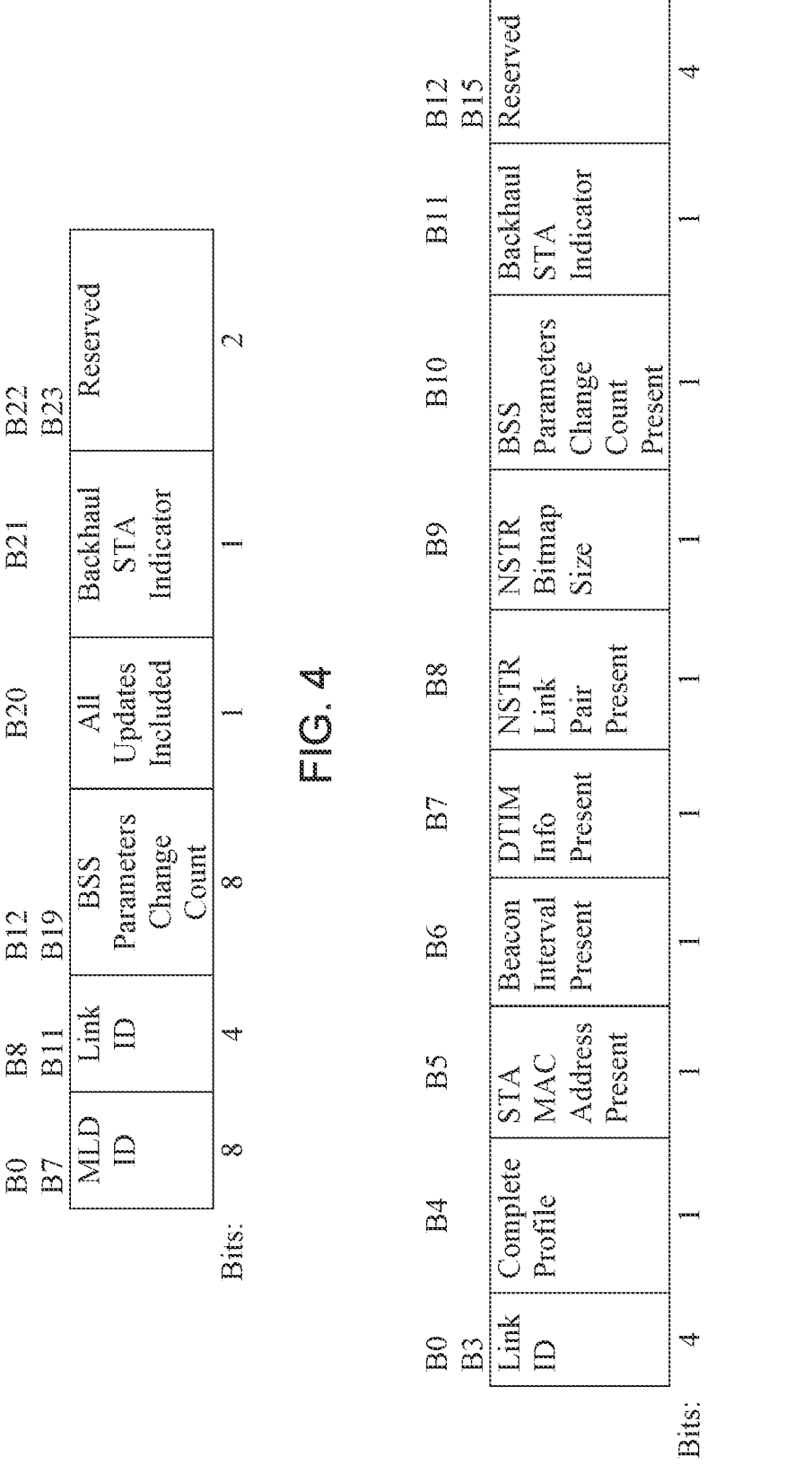
FIG. 4 illustrates an example MLD Parameters sub-field format including a backhaul STA indicator according to various embodiments of the present disclosure.
FIG. 5 illustrates an example STA control field format including a backhaul STA indicator according to embodiments of the present disclosure.

FIG. 4 illustrates an example MLD Parameters sub-field format including a backhaul STA indicator according to various embodiments of the present disclosure. The Backhaul STA Indicator bit can be set to 1 when the information in the Reduced Neighbor Report element corresponds to a STA that constitutes the backhaul link and is set to 0 otherwise.

When using the Reduced Neighbor Report element to indicate the presence of, or information related to, STAs that constitute the backhaul links, the fields of the Reduced Neighbor Report element that are not relevant for characterization of a STA but are relevant for characterization of an AP (e.g., BSSID, Short SSID, BSS parameters, etc.) can be used for providing information about the AP with which a STA that constitutes a backhaul link is associated. According to another embodiment, such fields can be left empty or can be omitted if that option is available in the Reduced Neighbor Report element.

According to various other embodiments, the Mobile AP MLD can indicate information of the STAs that constitute the backhaul in a Basic multi-link element. Further, according to this embodiment, the Mobile AP MLD can include the complete profile of a STA in the Per-STA Profile sub-element in the Basic Multi-link element. When such information is included in the Per-STA Profile sub-element, one or more bits of a STA control field can be used to indicate that the information corresponds to a STA that constitutes the backhaul link.

FIG. 5 illustrates an example STA control field format including a backhaul STA indicator according to embodiments of the present disclosure. In this example, bit B11 (a Backhaul STA Indicator bit) is set to 1 to indicate that corresponding STA information carried in a Per-STA Profile sub-element belongs to a STA that constitutes a backhaul link, and is set to 0 otherwise.

According to one embodiment, the STAs that constitute the backhaul can provide, to the APs that they are associated with, an indication about the presence of, or information related to, the APs that constitute the Mobile AP MLD. According to one such embodiment, the STAs that constitute the backhaul can indicate the presence of the APs that constitute the Mobile AP MLD via the Reduced Neighbor Report element. When an AP receives a Reduced Neighbor Report element from a non-AP STA, the information can be interpreted as discussed below after determining that the transmitter sending such information is a non-AP STA.

According to one such embodiment, the AP that receives a Reduced Neighbor Report element can be informed about the APs that constitute the Mobile AP MLD by the non-AP STA (e.g., STA1 or STA2) by using one or more bits of the MLD Parameters sub-field.

Figures 6, 7:
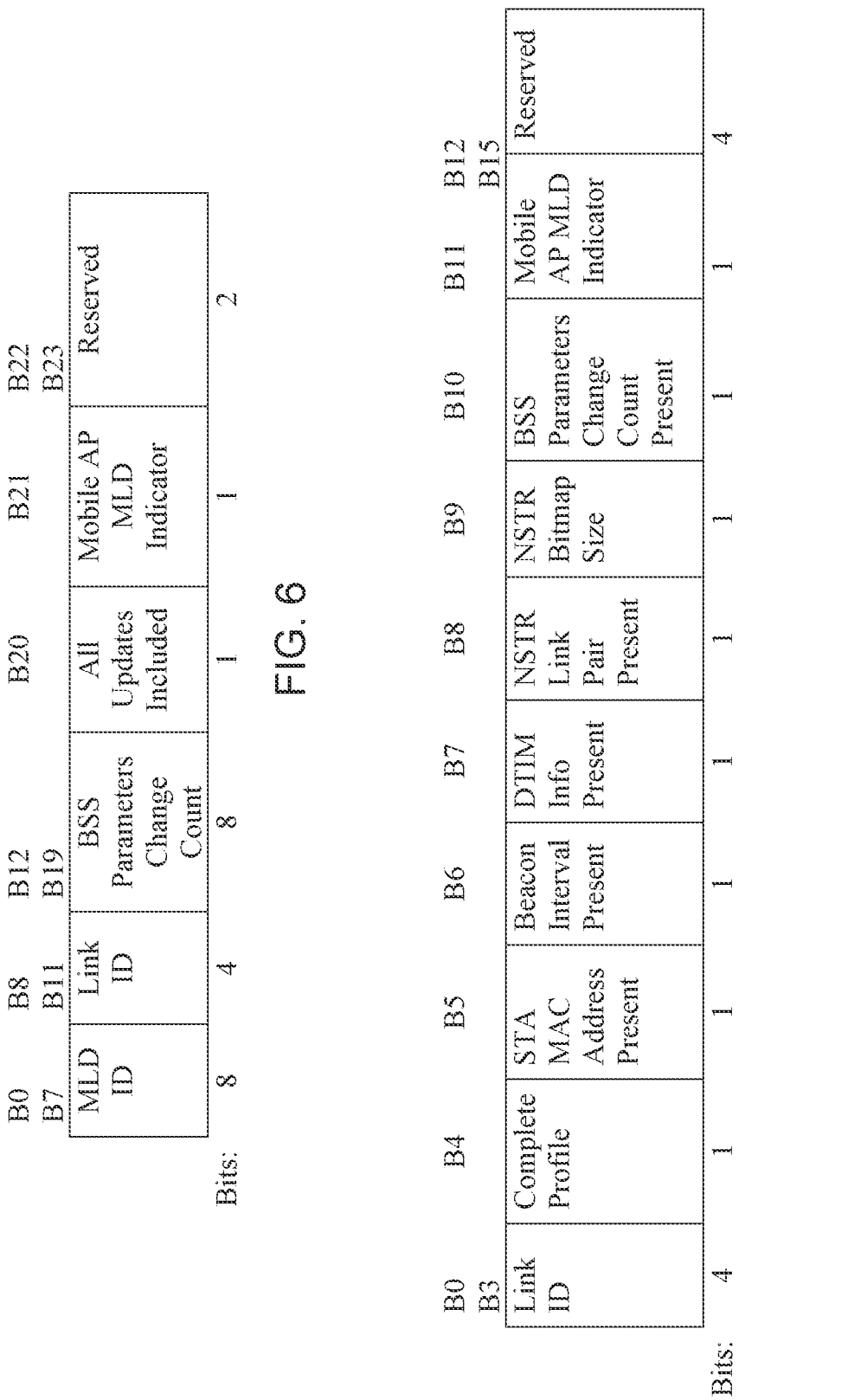
FIG. 6 illustrates an example MLD Parameters sub-field format including a bit that indicates that included information corresponds to an AP of a Mobile AP MLD according to various embodiments of the present disclosure.
FIG. 7 illustrates an example STA control field format including a Mobile AP MLD indicator according to various embodiments of the present disclosure.

FIG. 6 illustrates an example MLD Parameters sub-field format including a bit that indicates that included information corresponds to an AP of a Mobile AP MLD according to various embodiments of the present disclosure. In this example, the B21 bit (a Mobile AP MLD Indicator bit) is set to 1 when the information in the Reduced Neighbor Report element corresponds to an AP of the Mobile AP MLD, and is otherwise set to 0.

When an AP of an AP MLD receives a Reduced Neighbor Report element from an associated non-AP STA (e.g., STA1 or STA2), it can interpret the information in the Reduced Neighbor Report as belonging an AP of a Mobile AP MLD (e.g., AP1 or AP2 of Mobile AP MLD 302) being reported by a STA located on the same device (e.g., Device A).

According to one embodiment, the STAs that constitute the backhaul can indicate information of the APs of the Mobile AP MLD in the Basic multi-link element. Further, according to this embodiment, a STA can include the complete profile of an AP in the Per-STA Profile sub-element in the Basic Multi-link element. According to one embodiment, when such information is included in the Per-STA Profile sub-element, one or more bits of the STA control field can be used to indicate that the information corresponds to an AP of the Mobile AP MLD.

FIG. 7 illustrates an example STA control field format including a Mobile AP MLD indicator according to various embodiments of the present disclosure. In this example, bit B11 (a Mobile AP MLD indicator bit) is used to indicate that corresponding information included in the Per-STA Profile sub-element belongs to an AP of the Mobile AP MLD when B11 is set to 1. When the information does not correspond to an AP of the Mobile AP MLD, the bit can be set to 0.

According to one embodiment, the STA that sends information about an AP of the Mobile AP MLD in the Reduced Neighbor Report element can further indicate whether the AP is an AP that forms the primary link of the Mobile AP MLD by using one or more bits of the Reduced Neighbor Report element. According to one embodiment, this indication can be provided via the MLD Parameters sub-field.

Figures 8, 9:
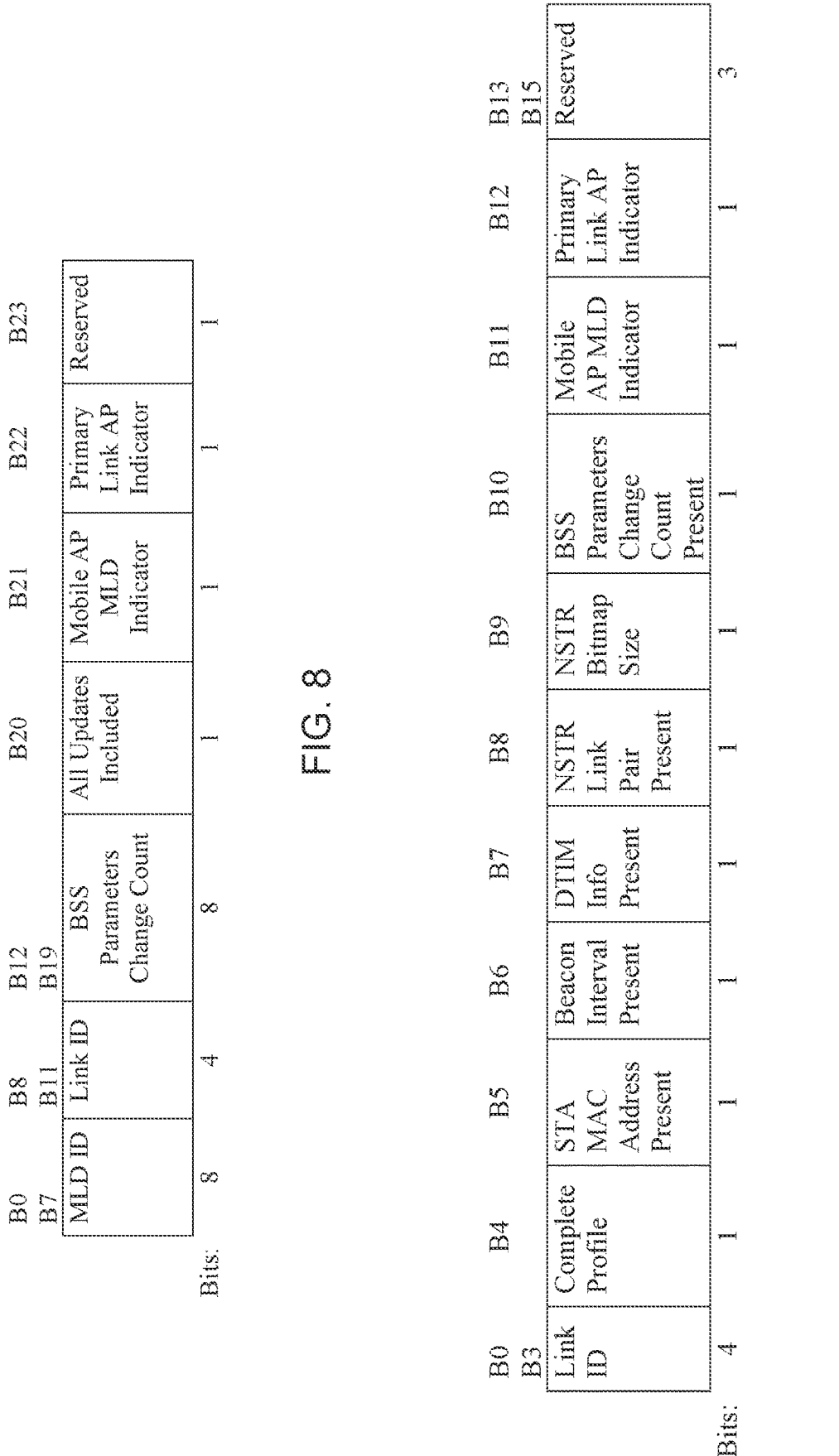
FIG. 8 illustrates an example MLD Parameters sub-field format including a primary link AP indication according to various embodiments of the present disclosure.
FIG. 9 illustrates an example STA control field format including a primary link AP indication according to various embodiments of the present disclosure.

FIG. 8 illustrates an example MLD Parameters sub-field format including a primary link AP indication according to various embodiments of the present disclosure. In this example, bit B22 (a Primary Link AP Indicator bit) is set to 1 when the information in the Reduced Neighbor Report element corresponds to the primary link AP of the Mobile AP MLD, and is otherwise set to 0.

According to another embodiment, this information can also be indicated in the Basic multi-link element. When such information is included in the Per-STA Profile sub-element, one or more bits of the STA control field can be used to indicate that the information corresponds to an AP that forms the primary link of the Mobile AP MLD.

FIG. 9 illustrates an example STA control field format including a primary link AP indication according to various embodiments of the present disclosure. In this example, the bit B12 (a Primary Link AP Indicator bit) is set to 1 to indicate that information carried in a Per-STA Profile sub-element belongs to an AP that constitutes the primary link of the Mobile AP MLD, and is set to 0 otherwise.

According to various embodiments, the links used for backhaul formation can be shared to carry traffic that does not originate from the APs of the Mobile AP. According to this embodiment, the STAs that constitute the backhaul links can also use the backhaul links to carry their own downlink and uplink traffic.

According to one such embodiment, the Mobile AP MLD can indicate that the STAs that constitute the backhaul can have their own downlink and uplink traffic—i.e., they constitute a shared backhaul link—via the Reduced Neighbor Report element. According to one embodiment, this indication can be provided by the Mobile AP MLD via the MLD Parameters sub-field.

Figures 10, 11:
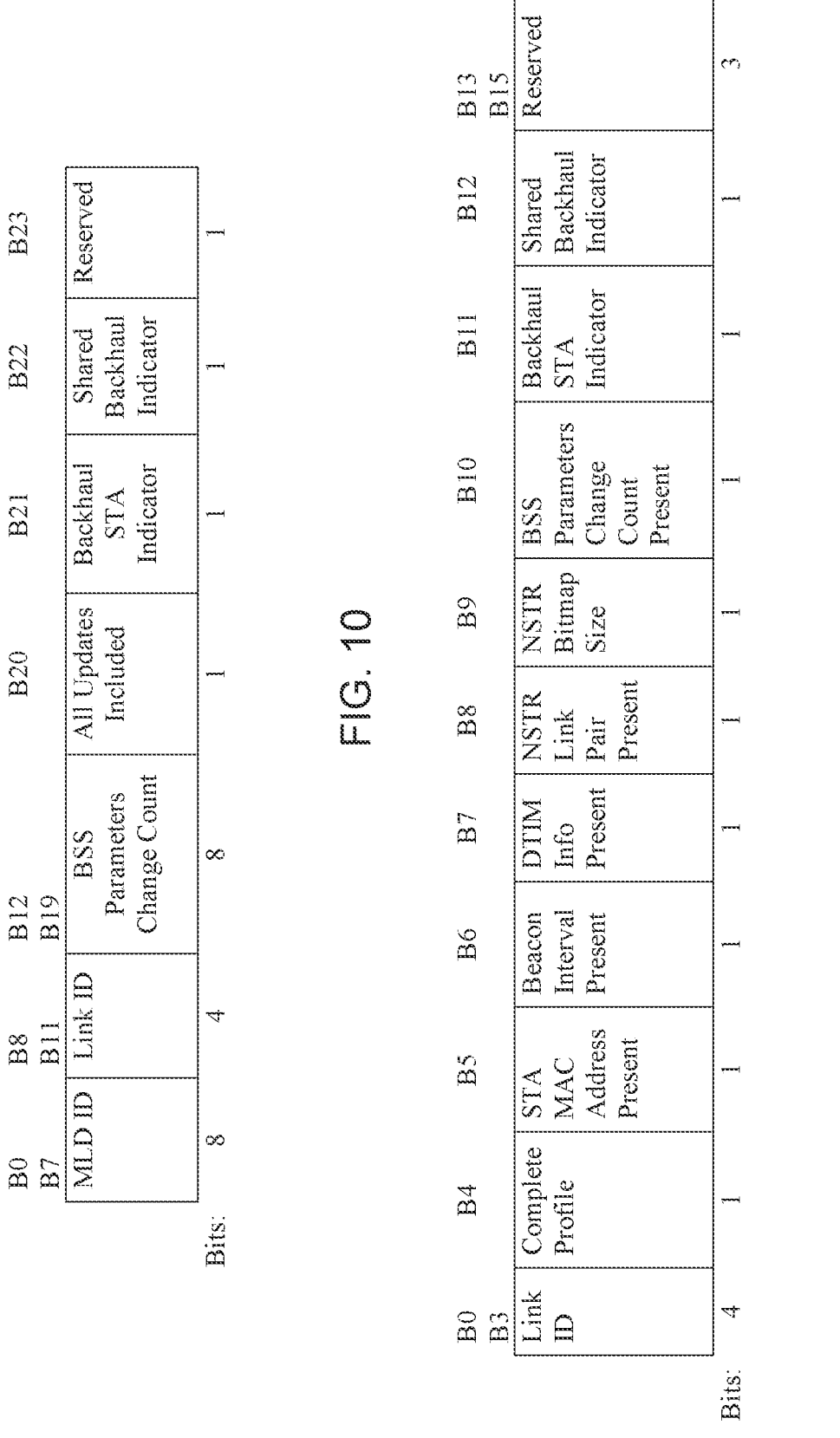
FIG. 10 illustrates an example MLD Parameters sub-field including a shared backhaul indication according to various embodiments of the present disclosure.
FIG. 11 illustrates an example STA control field format including a shared backhaul indication according to various embodiments of the present disclosure.

FIG. 10 illustrates an example MLD Parameters sub-field including a shared backhaul indication according to various embodiments of the present disclosure. In this example, bit B22 (a Shared Backhaul Indicator bit) is set to 1 to indicate a shared backhaul link, and is set to 0 otherwise.

According to another embodiment, this information can be indicated in the Basic multi-link element. When such information is included in the Per-STA Profile sub-element, one or more bits of the STA control field can be used to indicate that the information corresponds to a STA that creates a shared backhaul link.

FIG. 11 illustrates an example STA control field format including a shared backhaul indication according to various embodiments of the present disclosure. In this example, bit B12 (a Shared Backhaul Indicator bit) is set to 1 to indicate a shared backhaul link, and is set to 0 otherwise.

According to one embodiment, a STA that constitutes the backhaul link can provide an indication that the QoS expectations of a traffic flow that it provides to its associated AP affiliated with an AP MLD corresponds to the traffic being generated by the Mobile AP MLD by using one or more fields of a QoS characteristic element. Such an indication can enable the AP MLD with which the STA that constitutes the backhaul link is associated to perform appropriate resource allocation for traffic of the Mobile AP MLD and for the traffic of the STA itself.

According to one such embodiment, the STA can provide such an indication via the Control Info field of the QoS characteristic element.

FIG. 12 illustrates an example Control Info field format of a QoS characteristic element including an indication of that QoS expectations of a traffic flow correspond to traffic being generated by a Mobile AP MLD according to various embodiments of the present disclosure. In this example, the Direction sub-field of the Control field can be used to provide this indication. When the B0 and B1 bits of the Direction sub-field are both set to 1, the QoS expectations indicated in the QoS characteristic element can be considered as belonging to the traffic corresponding to the Mobile AP.

According to various embodiments, the above architecture can be used for improving coordination for setup of backhaul links and access links—I.e., UL/DL links—of the Mobile AP MLD such that they do not interfere with each other. For example, backhaul link STAs and APs of the Mobile AP MLD may negotiate to reconfigure backhaul links as needed.

Figure 13A:
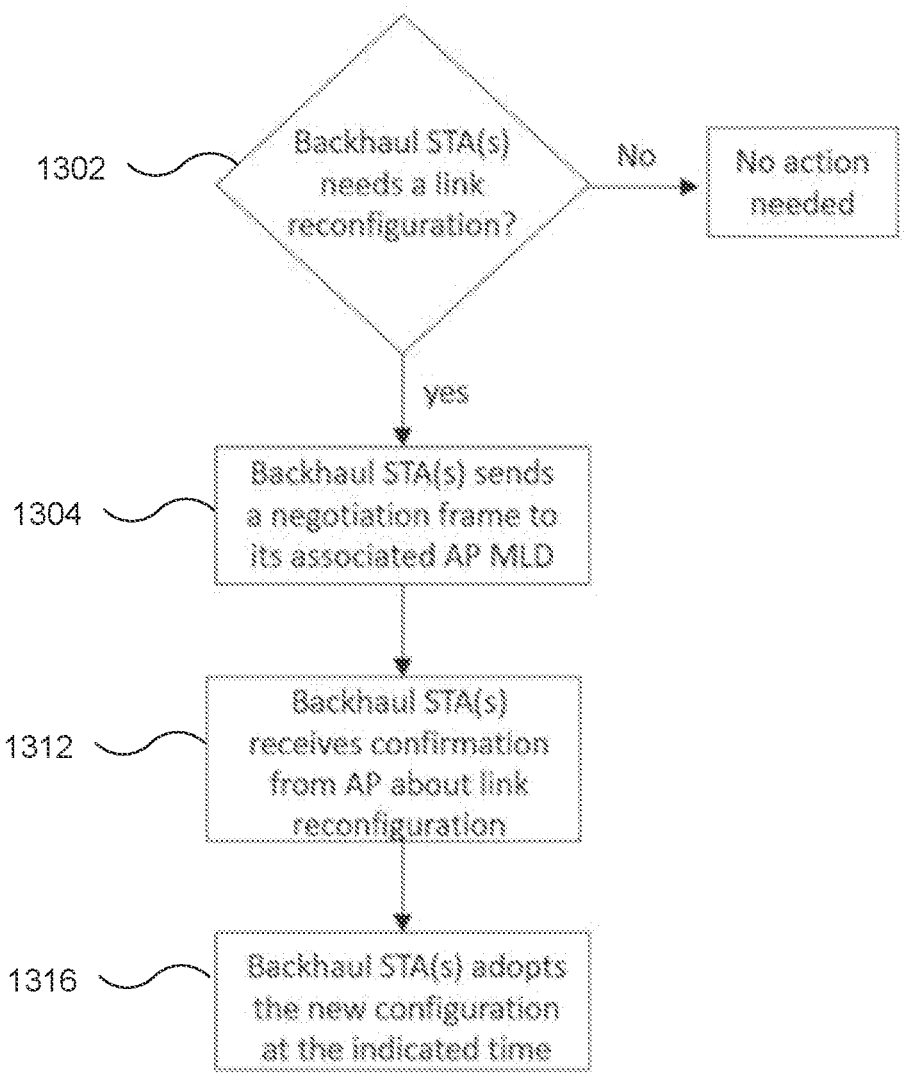
FIGS. 13A and 13B illustrate an example process from the point of view, respectively, of a backhaul link STA and an AP of the Mobile AP MLD to negotiate reconfiguration of a backhaul link according to various embodiments of the present disclosure.
Figure 13B:
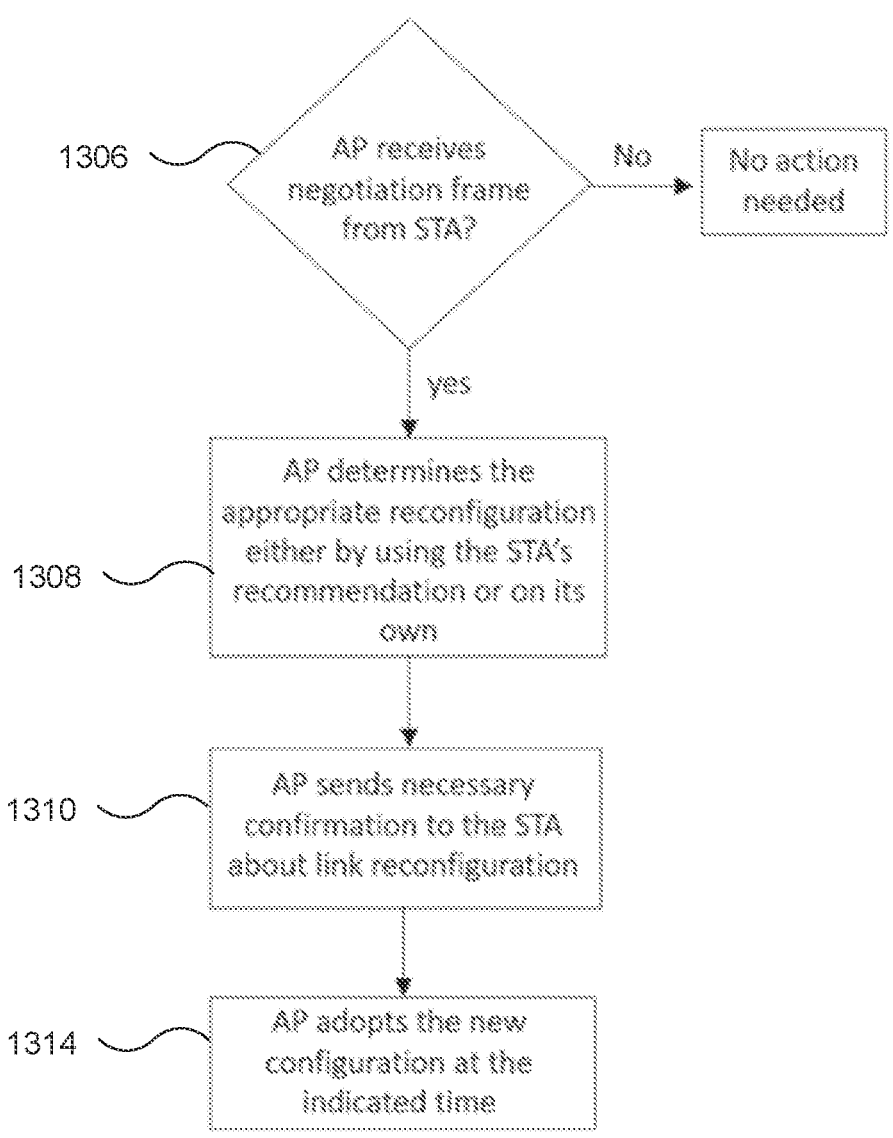

FIGS. 13A and 13B illustrate an example process from the point of view, respectively, of a backhaul link STA and an AP of the Mobile AP MLD to negotiate reconfiguration of a backhaul link according to various embodiments of the present disclosure. Upon determining that reconfiguration of a backhaul link is necessary (step 1302), a backhaul link STA can send a negotiation frame (step 1304) to request a reconfiguration from the AP. Upon receiving the negotiation frame from the STA (step 1306), the AP can either determine if the reconfiguration proposed by the STA is feasible or not or can determine a suitable reconfiguration (step 1308). The AP can then provide confirmation to the STA about link reconfiguration (steps 1310 and 1312). Following this, both AP and STA can adopt the new configuration at the indicated time (steps 1314 and 1316).

According to this embodiment, a STA that constitutes the backhaul link can indicate the desired backhaul link channel configuration to its associated AP MLD as shown in FIGS. 13A and 13B. Such an indication can be provided by the STA to its associated AP by transmitting a frame containing the channel number that it desires for the backhaul link.

Figures 14, 15, 16, 17:
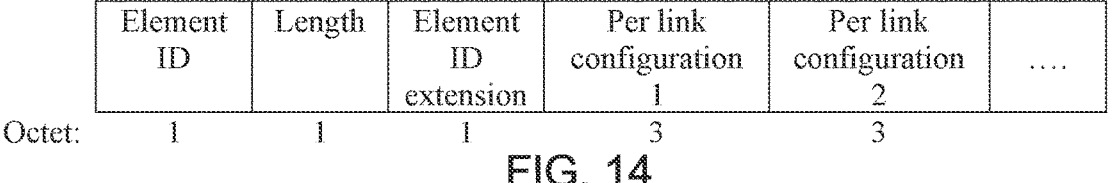
FIG. 14 illustrates an example negotiation frame transmitted by a backhaul STA to an AP with indication of a desired backhaul link configuration according to various embodiments of the present disclosure.
FIG. 15 illustrates an example per-link configuration field format of a negotiation frame according to various embodiments of the present disclosure.
FIG. 16 illustrates an example negotiation frame transmitted by a backhaul STA to an AP including link IDs of backhaul links that need reconfiguration according to various embodiments of the present disclosure.
FIG. 17 illustrates an example format of the Link ID List of Table 2 and FIG. 16 according to various embodiments of the present disclosure.

FIG. 14 illustrates an example negotiation frame transmitted by a backhaul STA to an AP with indication of a desired backhaul link configuration according to various embodiments of the present disclosure. In this example, the frame transmitted by the STA to the associated AP contains a per-link configuration field which provides information about the configuration desired for each link.

FIG. 15 illustrates an example per-link configuration field format of a negotiation frame according to various embodiments of the present disclosure. The sub-fields of the per-link configuration field can contain the information shown in Table 1.

TABLE 1

| Field | Size (in octets) | Description |
|---|---|---|
| Link ID | 1 octet or alternatively 4 bits of the octet keeping the remaining reserved | Link ID corresponding to the link for which the configuration is being requested |
| Desired Channel Number | 1 | The channel number corresponding to the channel that is being requested for the above link ID |
| Channel config change time | 1 | An indication of the time when the channel configuration for the above link ID needs to be changed. E.g., in units of TBTT to indicate when the channel needs to be changed. |

In one embodiment, upon receiving such a negotiation frame, the AP can use the indicated information and change the configuration to suit the Mobile AP MLD's needs without any explicit notification to the STA.

In another embodiment, upon receiving such a negotiation frame, the AP can transmit a negotiation response frame (with the same format as the negotiation frame). In the response frame, the AP can include per-link configuration elements which contain the link ID, the desired channel number that the AP intends to set, and the channel config change time that the AP intends to set. In this embodiment, the AP may choose to determine another configuration (if the one indicated by the STA is not suitable for it). The information indicated in the response frame would correspond to the final configuration that the AP intends to set.

In another embodiment, the STA can transmit a negotiation frame containing only link IDs of the backhaul links that need reconfiguration. FIG. 16 illustrates an example negotiation frame transmitted by a backhaul STA to an AP including link IDs of backhaul links that need reconfiguration according to various embodiments of the present disclosure. The negotiation frame of this example can contain the information shown in Table 2.

TABLE 2

| Field | Size (in octet) | Description |
|---|---|---|
| Reconfiguration link count | 1 | Number of backhaul links in Link ID list field for which a reconfiguration is being requested |
| Reconfiguration change time | 1 | Time at which the reconfiguration is begin requested |
| Link ID List | Variable | Contains Link ID for each backhaul link for which a reconfiguration is being requested. Number of links in this list is indicated in reconfiguration link count. If the number of links indicated is odd, then the remaining 4 bits can be kept reserved. |

FIG. 17 illustrates an example format of the Link ID List of Table 2 and FIG. 16 according to various embodiments of the present disclosure.

Furthermore, the STA can also provide information related to the APs of the Mobile AP MLD in the per-STA profile sub-element (e.g., leveraging the indication signaling of the STA Control field in the embodiments of FIG. 7 or 9).

Based on the above embodiments, upon receiving a negotiation frame from the STA (e.g., as illustrated in FIG. 13B), the AP that the backhaul link STA is associated with can have knowledge of the backhaul links that need reconfiguration. The AP would also have knowledge of the configuration of the APs of the Mobile AP. The APs that the backhaul link STAs are associated with can then use the information in the per-STA profile and determine a configuration for the backhaul links such that they does not interfere with the access links of the Mobile AP MLD.

Figure 18:
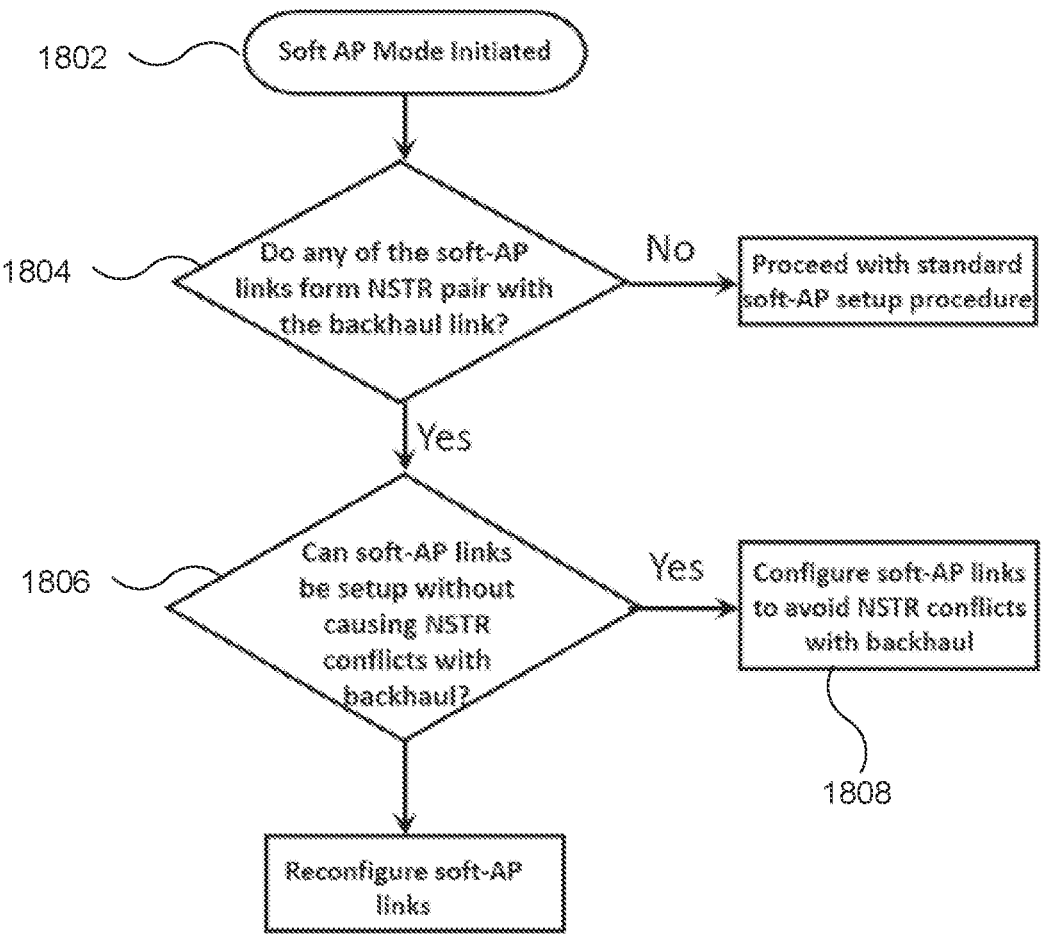
FIG. 18 illustrates an example process for configuration of the access links of the Mobile AP to avoid violating NSTR conditions according to various embodiments of the present disclosure.

FIG. 18 illustrates an example process for configuration of the access links of the Mobile AP to avoid violating NSTR conditions according to various embodiments of the present disclosure. As illustrated in this example, when Mobile AP Mode (also referred to as "Soft AP Mode") is initiated (step 1802), the MLD (e.g., Device A) can check if access links (or "Soft AP links") of the Mobile AP form an NSTR link pair with a backhaul link (step 1804). The MLD can maintain a set of channel configurations with which a sufficient level of isolation can be achieved such that its STAs can operate in STR mode. If NSTR link pairs are detected via the check, and if the MLD has such a set of channel configurations (step 1806), then MLD can configure the Mobile AP links to avoid NSTR conflicts with the backhaul (step 1808).

In one such embodiment, the MLD can divide the supported frequency bands (or channels) into groups that do not result in any NSTR conflicts and assign bands from one of such groups to the Mobile AP links. In one embodiment, the use of adjacent bands for Mobile AP links and backhaul links can be avoided while configuring the STAs. For example, a Mobile AP link may be configured to operate in the 5 GHz band whereas the backhaul link is configured to operate in the 2.4 GHz band.

The configuration of the Mobile AP links to avoid NSTR conflicts can be achieved via procedures used in the group formation process. In one embodiment, the Mobile AP links can be configured using the Mobile AP (or Soft AP) group owner (GO) negotiation procedure.

Figure 19:
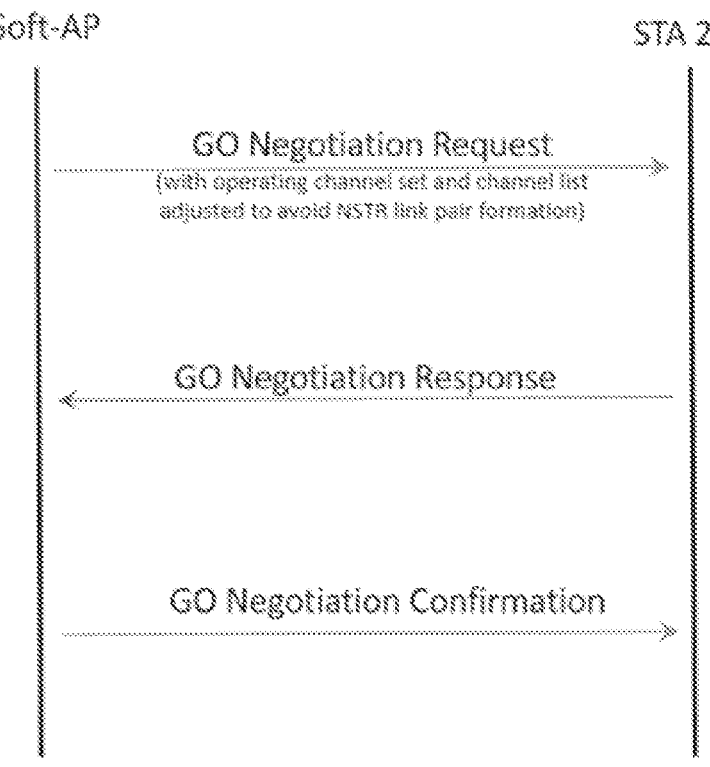
FIG. 19 illustrates an example Mobile AP (or Soft AP) group owner negotiation process for configuration of the access links of the Mobile AP to avoid violating NSTR conditions according to various embodiments of the present disclosure.

FIG. 19 illustrates an example Mobile AP (or Soft AP) group owner negotiation process for configuration of the access links of the Mobile AP to avoid violating NSTR conditions according to various embodiments of the present disclosure. In this example, the Mobile AP (or Soft AP) can transmit a modified GO Negotiation Request frame to its associated STA (e.g., STA2).

In one embodiment, the GO Negotiation Request frame can carry the operating channel attribute (configured by the Mobile AP to avoid NSTR conflicts with the backhaul) and an updated channel list attribute (including the channels that avoid NSTR conflicts with the backhaul).

In another embodiment, the GO Negotiation Request frame can contain a bit indicating an NSTR related configuration issue to indicate to the STA2 to accept the proposed configuration without modification or choose a configuration from the options made available in the channel list attribute. STA2 can either accept the proposed configuration or indicate a new configuration in the GO Negotiation response frame.

In yet another embodiment, the GO Negotiation Request frame can contain an NSTR bitmap to indicate the set of links that form NSTR link pairs with the backhaul. The associated STA2 can choose the configuration such that NSTR links are not formed with the backhaul, and indicate the choice via the GO Negotiation Response fame. In another embodiment, the GO Negotiation Request frame can contain an STR bitmap instead of the NSTR bitmap.

In one embodiment, when the Mobile AP links have not been set up, the Mobile AP can use procedures of the Mobile AP autonomous mode. The Mobile AP can use channels that do not cause any NSTR conflicts with the backhaul links and transmit beacons only on the selected channels. Thereby, the clients can discover the Mobile AP on the selected channels and continue further communication on the same channels.

Figure 20:
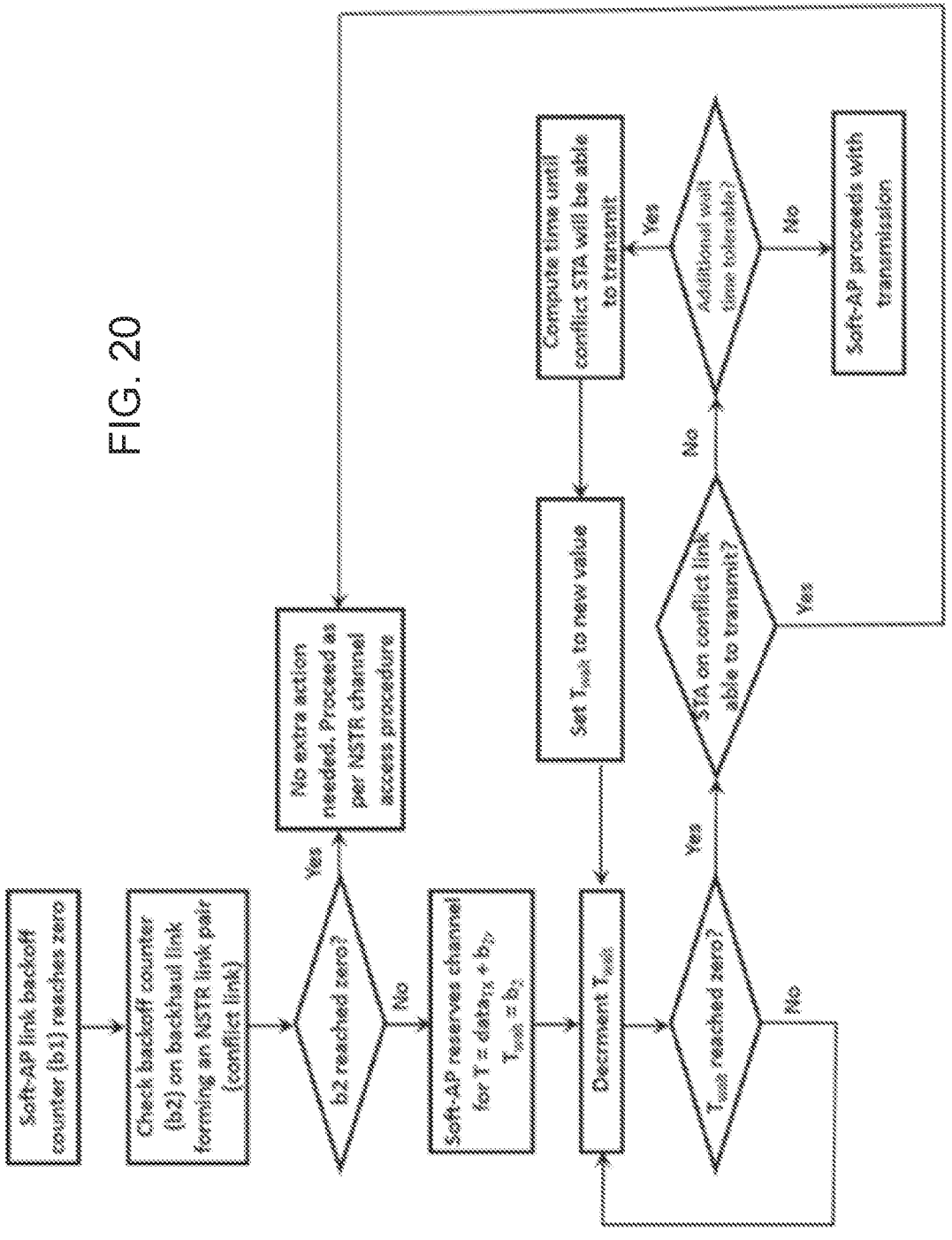
FIG. 20 illustrates an example wait time procedure for avoiding violation of NSTR conditions according to various embodiments of the present disclosure.

FIG. 20 illustrates an example wait time procedure for avoiding violation of NSTR conditions according to various embodiments of the present disclosure. In this example, when the Mobile AP is ready to transmit on its access links, it can check the backoff counter value of a STA used for a backhaul link. For example, when a backoff counter of an AP of the Mobile AP reaches zero, the AP can check if the backoff counter of a STA forming the backhaul and having NSTR conflicts with the access link has also reached zero. If the STA backoff counter has reached zero, the AP of the Mobile AP and the STA forming the backhaul can proceed as per the NSTR channel access procedure and initiate transmission.

However, if the backoff counter of the backhaul link STA has not reached zero, the AP of the Mobile AP can reserve the channel for an amount of time that is equal to the time to transmit its own data (including time for any MAC layer overhead, interframe spacings and acknowledgement) plus the remaining backoff counter value of the backhaul link STA. Following this, the AP of the Mobile AP can set a wait time ($T_{wait}$) equal to the remainder of the backoff counter of the backhaul link STA. When the wait time is completed, the AP of the Mobile AP can again check if the backhaul link STA is ready to transmit.

At this point, if the backhaul link STA is ready to transmit, the AP of the Mobile AP and the backhaul link STA can initiate transmission. However, it may happen that the backhaul link STA is not ready to transmit (e.g., the backhaul link STA has initiated a deferral procedure due to a transmission from a STA affiliated with a different MLD on its own link). When this happens, in one embodiment, the AP of the Mobile AP can start the transmission without the backhaul link STA. In another embodiment, the AP of the Mobile AP can compute the remainder of the deferral duration for the backhaul link STA and determine if the transmission can tolerate an additional delay of that amount.

If it can, the AP of the Mobile AP can set another wait time equal to the computed amount and again check the status of the backhaul link STA following the wait.

Figure 21C:
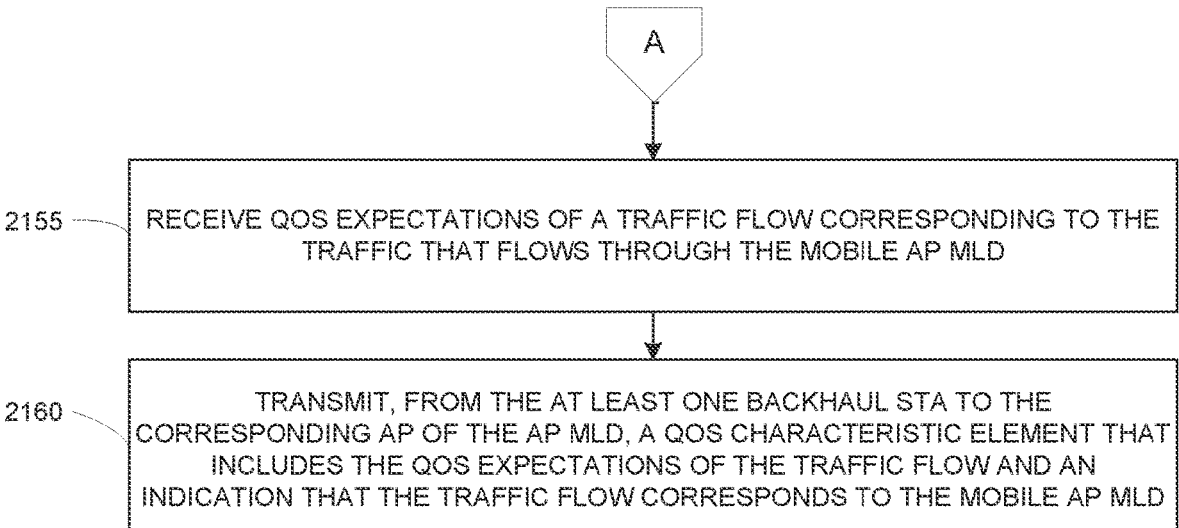

FIGS. 21A-21C illustrate an example process facilitating the use of STAs of an MLD to set up and operate backhaul links to serve a Mobile AP within the same MLD in WLANs according to various embodiments of the present disclosure. The process of FIGS. 21A-21C is discussed as being performed by an MLD 111, but it is understood that a corresponding AP MLD 101 and a corresponding non-AP MLD 112 perform corresponding processes. Additionally, for convenience, the process of FIGS. 21A-21C is discussed as being performed by a WI-FI MLD comprising a plurality of STAs that each comprise a transceiver, wherein some of the plurality of STAs are configured as APs forming a Mobile AP MLD, and some of the plurality of STAs are configured as backhaul STAs. However, it is understood that any suitable wireless communication device could perform these processes.

Referring to FIG. 21A, the process begins with the MLD instructing at least one AP forming the Mobile AP MLD to set up an access link with a corresponding STA of a non-AP MLD (step 2105). The access link may include a primary link and a non-primary link.

Next, in some embodiments the MLD may transmit, from the at least one AP to the corresponding STA of the non-AP MLD, a capability indication that indicates availability of the at least one backhaul STA to form the backhaul link (step 2110). The capability indication may be a reduced neighbor report element or a basic multi-link element.

If step 2110 is performed, the MLD will then receive, at the at least one AP from the corresponding STA of the non-AP MLD, a request to set up the backhaul link (step 2115).

At step 2120, the MLD instructs at least one backhaul STA to set up a backhaul link with a corresponding AP of an AP MLD to carry traffic of the non-AP MLD that flows through the Mobile AP MLD over the access link. Step 2120 may be performed in response to the request received at step 2115 (e.g., to create an on-demand backhaul link), or may be performed without the indication of step 2110 or the request of step 2115 (e.g., when setting up initial backhaul links).

The MLD may then, in some embodiments, transmit, from the at least one backhaul STA to the corresponding AP of the AP MLD, an indication of information related to the APs of the Mobile AP MLD for which the backhaul link carries traffic (step 2125). This indication may be a reduced neighbor report element or a basic multi-link element.

Referring now to FIG. 21B, the MLD may determine that reconfiguration of the backhaul link is necessary to avoid interference between the backhaul link and the access link (step 2130). In some cases, the MLD may also determine a desired channel configuration for the reconfiguration of the backhaul link (step 2135).

The MLD then transmits, from the at least one backhaul STA to the corresponding AP of the AP MLD, a request for the reconfiguration of the backhaul link (step 2140). If step 2135 was performed, then the reconfiguration request includes the desired channel configuration. In other cases, the reconfiguration request instead includes a link identifier of the backhaul link that needs reconfiguration, and may also include configuration information of the APs of the Mobile AP MLD.

Next, the MLD receives, at the at least one backhaul STA from the corresponding AP of the AP MLD, a response to the request that includes information on a new configuration for the backhaul link and an indication of a time to adopt the new configuration (step 2145). The information on the new configuration for the backhaul link may be the information on the desired channel configuration, if transmitted at step 2140, or may be information on a different channel configuration determined by the AP of the AP MLD.

The MLD then instructs the at least one backhaul STA to adopt the new configuration at the indicated time (step 2150).

Referring now to FIG. 21C, the MLD may receive QoS expectations of a traffic flow corresponding to the traffic that flows through the Mobile AP MLD (step 2155).

The MLD then transmits, from the at least one backhaul STA to the corresponding AP of the AP MLD, a QoS characteristic element that includes the QoS expectations of the traffic flow and an indication that the traffic flow corresponds to the Mobile AP MLD (step 2160).

The above flowcharts illustrate an example method that can be implemented in accordance with the principles of the present disclosure and various changes could be made to the method illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A multi-link device (MLD) comprising:
access points (APs) forming a Mobile AP MLD, each of the APs configured as an AP station (STA) and comprising a transceiver, the APs configured to form a primary link and a non-primary link with corresponding stations (STAs) configured as non-AP STAs of a non-AP MLD;
backhaul STAs, each of the backhaul STAs configured as a non-AP STA and comprising a transceiver; and
a processor operably coupled to the APs and the backhaul STAs, the processor configured to:
instruct at least one of the APs to set up an access link with its corresponding STA; and
instruct at least one of the backhaul STAs to set up a backhaul link with a corresponding AP configured as an AP STA of an AP MLD to carry traffic of the non-AP MLD that flows through the Mobile AP MLD over the access link.

2. The MLD of claim 1, wherein:
the processor is further configured to generate a capability indication that indicates availability of the backhaul STAs to form the backhaul link,
the transceiver of the at least one AP is configured to:
transmit, to the corresponding STA of the non-AP MLD, the capability indication; and
receive, from the corresponding STA of the non-AP MLD, a request to set up the backhaul link, and
the processor is further configured to instruct the at least one backhaul STA to set up the backhaul link in response to the received request.

3. The MLD of claim 2, wherein the processor is further configured to generate the capability indication as a reduced neighbor report element or as a basic multi-link element.

4. The MLD of claim 1, wherein:

the processor is further configured to generate an indication of information of the APs of the Mobile AP MLD for which the backhaul link carries traffic, and the transceiver of the at least one backhaul STA is configured to transmit, to the corresponding AP of the AP MLD, the indication.

5. The MLD of claim 1, wherein:

the processor is further configured to:

determine that reconfiguration of the backhaul link is necessary to avoid interference between the backhaul link and the access link; and generate a request for the reconfiguration of the backhaul link, the transceiver of the at least one backhaul STA is configured to:

transmit, to the corresponding AP of the AP MLD, a request for the reconfiguration of the backhaul link; and receive, from the corresponding AP of the AP MLD, a response to the request that includes information on a new configuration for the backhaul link and an indication of a time to adopt the new configuration, and the processor is further configured to instruct the at least one backhaul STA to adopt the new configuration at the indicated time.

6. The MLD of claim 5, wherein the processor is further configured to:

determine a desired channel configuration for the reconfiguration of the backhaul link, and generate the request for the reconfiguration of the backhaul link to include the desired channel configuration.

7. The MLD of claim 5, wherein the processor is further configured to generate the request for the reconfiguration of the backhaul link to include a link identifier of the backhaul link and configuration information of the APs of the Mobile AP MLD.

8. The MLD of claim 1, wherein:

the processor is further configured to:

receive quality of service (QOS) expectations of a traffic flow corresponding to the traffic that flows through the Mobile AP MLD; and generate a QoS characteristic element that includes the QoS expectations of the traffic flow and an indication that the traffic flow corresponds to the Mobile AP MLD, and the transceiver of the at least one backhaul STA is configured to transmit, to the corresponding AP of the AP MLD, the QoS characteristic element.

9. The MLD of claim 8, wherein the processor is further configured to configure a direction subfield of the QOS characteristic element to indicate that the traffic flow corresponds to the Mobile AP MLD.

10. The MLD of claim 1, wherein the processor is further configured to:

determine whether the access link forms a non-simultaneous transmit/receive (NSTR) link pair with the backhaul link, and based on a determination that the access link forms an NSTR link pair with the backhaul link, reconfigure the access link such that it does not form the NSTR link pair with the backhaul link.

11. A method of a multi-link device (MLD), comprising:

instructing at least one access point (AP) of a plurality of APs forming a Mobile AP MLD to set up an access link with a corresponding station (STA) configured as a non AP STA of a non-AP MLD, the plurality of APs forming a primary link and a non-primary link with corresponding STAs of the non-AP MLD, each of the plurality of APs configured as an AP STA; and instructing at least one backhaul STA of a plurality of backhaul STAs to set up a backhaul link with a corresponding AP configured as an AP STA of an AP MLD to carry traffic of the non-AP MLD that flows through the Mobile AP MLD over the access link, each of the plurality of backhaul STAs configured as a non-AP STA, wherein the MLD comprises the plurality of APs forming the Mobile AP MLD and the plurality of backhaul STAs.

12. The method of claim 11, further comprising:

transmitting, from the at least one AP to the corresponding STA of the non-AP MLD, a capability indication that indicates availability of the at least one backhaul STA to form the backhaul link;

receiving, at the at least one AP from the corresponding STA of the non-AP MLD, a request to set up the backhaul link; and instructing the at least one backhaul STA to set up the backhaul link in response to the received request.

13. The method of claim 12, wherein the capability indication is a reduced neighbor report element or a basic multi-link element.

14. The method of claim 11, further comprising transmitting, from the at least one backhaul STA to the corresponding AP of the AP MLD, an indication of information of the APs of the Mobile AP MLD for which the backhaul link carries traffic.

15. The method of claim 11, further comprising:

determining that reconfiguration of the backhaul link is necessary to avoid interference between the backhaul link and the access link;

transmitting, from the at least one backhaul STA to the corresponding AP of the AP MLD, a request for the reconfiguration of the backhaul link;

receiving, at the at least one backhaul STA from the corresponding AP of the AP MLD, a response to the request that includes information on a new configuration for the backhaul link and an indication of a time to adopt the new configuration; and instructing the at least one backhaul STA to adopt the new configuration at the indicated time.

16. The method of claim 15, further comprising:

determining a desired channel configuration for the reconfiguration of the backhaul link, wherein the request for the reconfiguration of the backhaul link includes the desired channel configuration.

17. The method of claim 15, wherein the request for the reconfiguration of the backhaul link includes a link identifier of the backhaul link and configuration information of the APs of the Mobile AP MLD.

18. The method of claim 11, further comprising:

receiving quality of service (QOS) expectations of a traffic flow corresponding to the traffic that flows through the Mobile AP MLD; and transmitting, from the at least one backhaul STA to the corresponding AP of the AP MLD, a QoS characteristic element that includes the QOS expectations of the traffic flow and an indication that the traffic flow corresponds to the Mobile AP MLD.

19. The method of claim 18, further comprising configuring a direction subfield of the QoS characteristic element to indicate that the traffic flow corresponds to the Mobile AP MLD.

20. The method of claim 11, further comprising:

determining whether the access link forms a non-simultaneous transmit/receive (NSTR) link pair with the backhaul link; and based on a determination that the access link forms an NSTR link pair with the backhaul link, reconfiguring the access link such that it does not form the NSTR link pair with the backhaul link.

* * * * *